United States Patent
Bridge et al.

(10) Patent No.: US 9,757,804 B2
(45) Date of Patent: Sep. 12, 2017

(54) HIGH PRESSURE COOLANT TUBE AND TOOL BODY-HIGH PRESSURE COOLANT TUBE ASSEMBLY

(71) Applicant: Kennametal Inc., Latrobe, PA (US)

(72) Inventors: Carol Ann Bridge, Greensburg, PA (US); Jeanne Marie McCullough, Derry, PA (US)

(73) Assignee: KENNAMETAL INC, Latrobe, PA (US)

( * ) Notice: Subject to any disclaimer, the term of this patent is extended or adjusted under 35 U.S.C. 154(b) by 883 days.

(21) Appl. No.: 13/962,237

(22) Filed: Aug. 8, 2013

(65) Prior Publication Data

US 2015/0043979 A1   Feb. 12, 2015

(51) Int. Cl.
  *B23B 27/10* (2006.01)
  *F16L 19/02* (2006.01)
  (Continued)

(52) U.S. Cl.
  CPC ............ *B23B 27/10* (2013.01); *B23B 31/02* (2013.01); *B23C 5/28* (2013.01); *B23Q 1/0018* (2013.01);
  (Continued)

(58) Field of Classification Search
  CPC ..... B23C 5/28; B23Q 11/1023; B23Q 1/0018; F16L 19/0212; F16L 19/025;
  (Continued)

(56) References Cited

U.S. PATENT DOCUMENTS 2,797,938 A * 7/1957 Reynolds ............. F16J 15/3204
                                                                 277/561
3,583,731 A * 6/1971 Jewell ................... F16L 37/252
                                                                 285/325
(Continued)

FOREIGN PATENT DOCUMENTS

EP     0672817 A1     9/1995
EP     2272610 A1     1/2011
(Continued)

OTHER PUBLICATIONS

European Communication for European Patent Application No. 14177301.0-1758 mailed Feb. 10, 2015 (7 pages).
(Continued)

*Primary Examiner* — Sara Addisu
(74) *Attorney, Agent, or Firm* — Matthew S. Bedsole (57) ABSTRACT

A high pressure coolant tube for receipt by a tool body that includes a coolant tube body with an annular flange adjacent to the exit body end. There is a threaded collar that has an exterior threaded surface. The threaded collar contains an interior collar bore comprising an enlarged diameter interior collar bore surface portion and a reduced diameter interior collar bore surface portion. There is an exit seal pocket defined by an exit-facing flange surface of the annular flange and a reduced diameter body section and the enlarged diameter interior collar bore surface portion. There is an entrance seal assembly pocket defined by an entrance-facing flange surface of the annular flange and a reduced diameter body section and the enlarged diameter interior collar bore surface portion. An exit seal is in the exit seal pocket. An entrance seal assembly is in the entrance seal assembly pocket wherein the entrance seal assembly comprises an entrance seal sandwiched by a pair of thermoplastic polyester elastomeric rings.

11 Claims, 5 Drawing Sheets

(51) Int. Cl.
*F16L 19/025* (2006.01)
*B23Q 1/00* (2006.01)
*B23Q 11/10* (2006.01)
*B23C 5/28* (2006.01)
*B23B 31/02* (2006.01)

(52) U.S. Cl.
CPC ........ *B23Q 11/1023* (2013.01); *F16L 19/025* (2013.01); *F16L 19/0212* (2013.01); *B23B 2231/24* (2013.01); *B23B 2250/12* (2013.01); *B23B 2260/126* (2013.01); *Y10T 407/14* (2015.01)

(58) Field of Classification Search
CPC . B23B 2231/24; B23B 2250/12; B23B 27/10; B23B 31/02
See application file for complete search history.

(56) References Cited

U.S. PATENT DOCUMENTS

| | | | | |
|---|---|---|---|---|
| 3,630,532 A | * | 12/1971 | Traub | F16J 15/32 277/589 |
| 3,888,496 A | * | 6/1975 | Dryer | F16J 15/022 277/614 |
| 4,415,169 A | * | 11/1983 | Kim | F16L 27/12 277/300 |
| 4,793,637 A | | 12/1988 | Laipply | |
| 4,861,045 A | * | 8/1989 | Riley | B60H 1/3229 277/562 |
| 5,309,993 A | * | 5/1994 | Coon | E21B 33/1208 166/115 |
| 6,059,702 A | | 5/2000 | Winkler et al. | |
| 6,581,643 B2 | * | 6/2003 | Guippe | B32B 1/08 138/137 |
| 6,648,565 B2 | * | 11/2003 | Schweizer | B23B 29/046 408/57 |
| 7,056,971 B2 | * | 6/2006 | Varma | B65D 39/0017 524/490 |
| 7,959,384 B2 | * | 6/2011 | Breisch | B23B 27/10 407/109 |
| 8,075,545 B2 | * | 12/2011 | Moy | A61J 1/1475 206/221 |
| 8,740,519 B2 | * | 6/2014 | Stoll | B23B 31/1179 279/20 |
| 2005/0095075 A1 | | 5/2005 | Schweizer et al. | |
| 2009/0256318 A1 | * | 10/2009 | Stolz | B23B 31/005 279/28 |
| 2010/0028096 A1 | * | 2/2010 | McCracken | B23B 49/02 408/1 R |
| 2011/0169230 A1 | * | 7/2011 | Babel | B23B 31/008 279/20 |
| 2012/0119445 A1 | * | 5/2012 | Castillo | F16J 15/126 277/314 |
| 2012/0211950 A1 | * | 8/2012 | Matheis | B23B 31/028 279/20 |
| 2013/0000920 A1 | * | 1/2013 | Duong | E21B 33/043 166/368 |
| 2014/0005629 A1 | * | 1/2014 | Moy | A61J 1/2089 604/403 |
| 2014/0064862 A1 | * | 3/2014 | Breisch | B23B 27/10 407/11 |

FOREIGN PATENT DOCUMENTS

| | | |
|---|---|---|
| EP | 2573433 A1 | 3/2013 |
| WO | 2010046046 A2 | 4/2010 |

OTHER PUBLICATIONS

European Communication for European Patent Application No. 14177301.0 1758 mailed Mar. 16, 2015 (2 pages).
Declaration of Ruy Frota de Souza dated Apr. 30, 2014 (5 pages).

* cited by examiner

HIGH PRESSURE COOLANT TUBE AND TOOL BODY-HIGH PRESSURE COOLANT TUBE ASSEMBLY

BACKGROUND

The invention pertains to a high pressure coolant tube utilized to fluidly connect a tool holder to a clamping unit assembly and a tool body-high pressure coolant tube assembly. More specifically, the invention pertains to a high pressure coolant tube that allows for the delivery of coolant under higher pressures (e.g., 500 bar) than heretofore used (80 bar) without detrimental consequences such as the backflow contamination of the clamping unit assembly, and a tool body-high pressure coolant tube assembly.

Metal cutting tools for performing metal working operations generally comprise a cutting insert having a surface terminating at a cutting edge and a tool holder formed with a seat adapted to receive the insert. The cutting insert engages a workpiece to remove material, and in the process forms chips of the material. Excessive heat at the insert-chip interface can negatively impact upon (i.e., reduce or shorten) the useful tool life of the cutting insert. For example, a chip generated from the workpiece can sometimes stick (e.g., through welding) to the surface of the cutting insert. The build up of chip material on the cutting insert in this fashion is an undesirable occurrence that can negatively impact upon the performance of the cutting insert, and hence, the overall material removal operation. A flow of coolant to the insert-chip interface will reduce the potential for such welding. It would therefore be desirable to reduce excessive heat at the insert-chip interface to eliminate or reduce build up of chip material. As another example, in a chipforming material removal operation, there can occur instances in which the chips do not exit the region of the insert-chip interface when the chip sticks to the cutting insert. When a chip does not exit the region of the insert-chip interface, there is the potential that a chip can be re-cut. It is undesirable for the milling insert to re-cut a chip already removed from the workpiece. A flow of coolant to the insert-chip interface will facilitate the evacuation of chips from the insert-chip interface thereby minimizing the potential that a chip will be re-cut. There is an appreciation that a shorter useful tool life increases operating costs and decreases overall production efficiency. Excessive heat at the insert-chip interface contribute to the welding of chip material and re-cutting of chips, both of which are detrimental to production efficiency. There are readily apparent advantages connected with decreasing the heat at the insert-chip interface wherein one way to decrease the temperature is to supply coolant to the insert-chip interface.

A machine tool includes a spindle that includes a clamping unit assembly. The clamping unit assembly clamps (or affixes) a tool body to the spindle. The tool body carries the cutting insert in one fashion or another. In a machine tool that provide for the delivery coolant to the cutting insert, each one of the tool body and the clamping unit assembly contains a bore through which coolant can flow. Because the tool body and clamping unit assembly are separate components, in order to achieve satisfactory coolant flow to the cutting insert, the coolant must be able to flow from the clamping unit assembly to the tool body. Heretofore, a coolant tube has been used to fluidly connect the tool body and the clamping unit assembly. Exemplary coolant tubes are described in United States Patent Application Publication No. US2005/0095075 to Schweizer et al., WIPO Publication No. WO/2010/046046 A2 to Chi-Ron Werke GmbH & Co. KG, and U.S. Pat. No. 6,059,712 to Winkler et al.

While coolant tubes have functioned in an acceptable manner at pressures equal to about 80 bar, heretofore, one drawback has been that earlier coolant tubes have not been able to satisfactorily accommodate the delivery of coolant at high pressures (e.g., 500 bar). One detrimental result with using earlier coolant tubes at high pressures has been backflow that contaminates the clamping unit assembly. Thus, it would be highly desirable to provide a high pressure coolant tube, as well as a tool body-high pressure coolant tube assembly, that achieves satisfactory performance at coolant pressures in a pressure region equal to about 500 bar. It would be highly desirable to provide a high pressure coolant tube, as well as a tool body-high pressure coolant tube assembly, that when subjected to coolant pressures in a pressure region equal to about 500 bar, the coolant tube does not allow for backflow contamination of the clamping unit assembly.

SUMMARY OF THE INVENTION

In one form, the invention is a high pressure coolant tube for receipt by a tool body. The high pressure coolant tube comprises a coolant tube body that has an entrance body end and an exit body end, and the coolant tube body has an annular flange adjacent to the exit body end. There is a threaded collar that has an exterior threaded surface. The threaded collar contains an interior collar bore comprising an enlarged diameter interior collar bore surface portion and a reduced diameter interior collar bore surface portion. There is an exit seal pocket defined by an exit-facing flange surface of the annular flange and a reduced diameter body section and the enlarged diameter interior collar bore surface portion. There is an entrance seal assembly pocket defined by an entrance-facing flange surface of the annular flange and a reduced diameter body section and the enlarged diameter interior collar bore surface portion. An exit seal is in the exit seal pocket. An entrance seal assembly is in the entrance seal assembly pocket wherein the entrance seal assembly comprises an entrance seal sandwiched by a pair of thermoplastic polyester elastomeric rings.

In another form thereof, the invention is a tool body-high pressure coolant tube assembly comprising a tool body and a high pressure coolant tube. The tool body contains a bore having a threaded bore portion wherein the threaded bore portion terminates at a tool body shoulder. The high pressure coolant tube comprises a coolant tube body that has an entrance body end and an exit body end, and the coolant tube body has an annular flange adjacent to the exit body end. There is a threaded collar that has an exterior threaded surface. The threaded collar contains an interior collar bore comprising an enlarged diameter interior collar bore surface portion and a reduced diameter interior collar bore surface portion. There is an exit seal pocket defined by an exit-facing flange surface of the annular flange and a reduced diameter body section and the enlarged diameter interior collar bore surface portion. There is an entrance seal assembly pocket defined by an entrance-facing flange surface of the annular flange and a reduced diameter body section and the enlarged diameter interior collar bore surface portion. An exit seal is in the exit seal pocket. An entrance seal assembly is in the entrance seal assembly pocket wherein the entrance seal assembly comprises an entrance seal sandwiched by a pair of thermoplastic polyester elastomeric rings. Upon the complete insertion of the high pressure coolant tube into the bore of the tool body, the exit seal is compressed between the tool body shoulder and the exit-facing flange surface of the annular flange.

In still another form thereof, the invention is a high pressure coolant tube for receipt by a tool body and capable of operating at a coolant pressure of up to about 500 bar. The high pressure coolant tube comprises a coolant tube body having an entrance body end and an exit body end, as well as an annular flange adjacent to the exit body end. There is a threaded collar that has an exterior threaded surface and which contains an interior collar bore comprising an enlarged diameter interior collar bore surface portion and a reduced diameter interior collar bore surface portion. There is an exit seal pocket defined by an exit-facing flange surface of the annular flange and a reduced diameter body section and the enlarged diameter interior collar bore surface portion. There is an entrance seal assembly pocket defined by an entrance-facing flange surface of the annular flange and a reduced diameter body section and the enlarged diameter interior collar bore surface portion. An exit seal is in the exit seal pocket wherein the exit seal comprises a rubber material. An entrance seal assembly is in the entrance seal assembly pocket. The entrance seal assembly comprises an entrance seal sandwiched by a pair of thermoplastic polyester elastomeric rings wherein the entrance seal comprises a rubber material and the thermoplastic polyester elastomeric rings having a hardness of between about 51 Shore D and about 61 Shore D.

BRIEF DESCRIPTION OF THE DRAWINGS

The following is a brief description of the drawings that form a part of this patent application.

DETAILED DESCRIPTION

As mentioned hereinabove, exemplary coolant tubes are described in United States Patent Application Publication No. US2005/0095075 to Schweizer et al., WIPO Publication No. WO/2010/046046 A2 to Chi-Ron Werke GmbH & Co. KG, and U.S. Pat. No. 6,059,712 to Winkler et al. wherein each of the above documents in its entirety is hereby incorporated by reference herein. These documents show earlier coolant tubes and the environment in which they are used to provide coolant flow. For the sake of simplicity, applicants will not describe the details of the machine tool, the spindle and other components of a machine tool assembly keeping in mind that one or ordinary skill in the art is familiar with these components and their operation. One focus of this invention is on a high pressure coolant tube, as well as a tool body-high pressure coolant tube assembly, utilized to fluidly connect a tool body to a clamping unit assembly. Another focus of the invention pertains to a high pressure coolant tube, as well as tool body-high pressure coolant tube assembly, that allows for the delivery of coolant under higher pressures (e.g., 500 bar) than heretofore used (80 bar) without detrimental consequences such as the backflow contamination of the clamping unit assembly.

Figure 4:
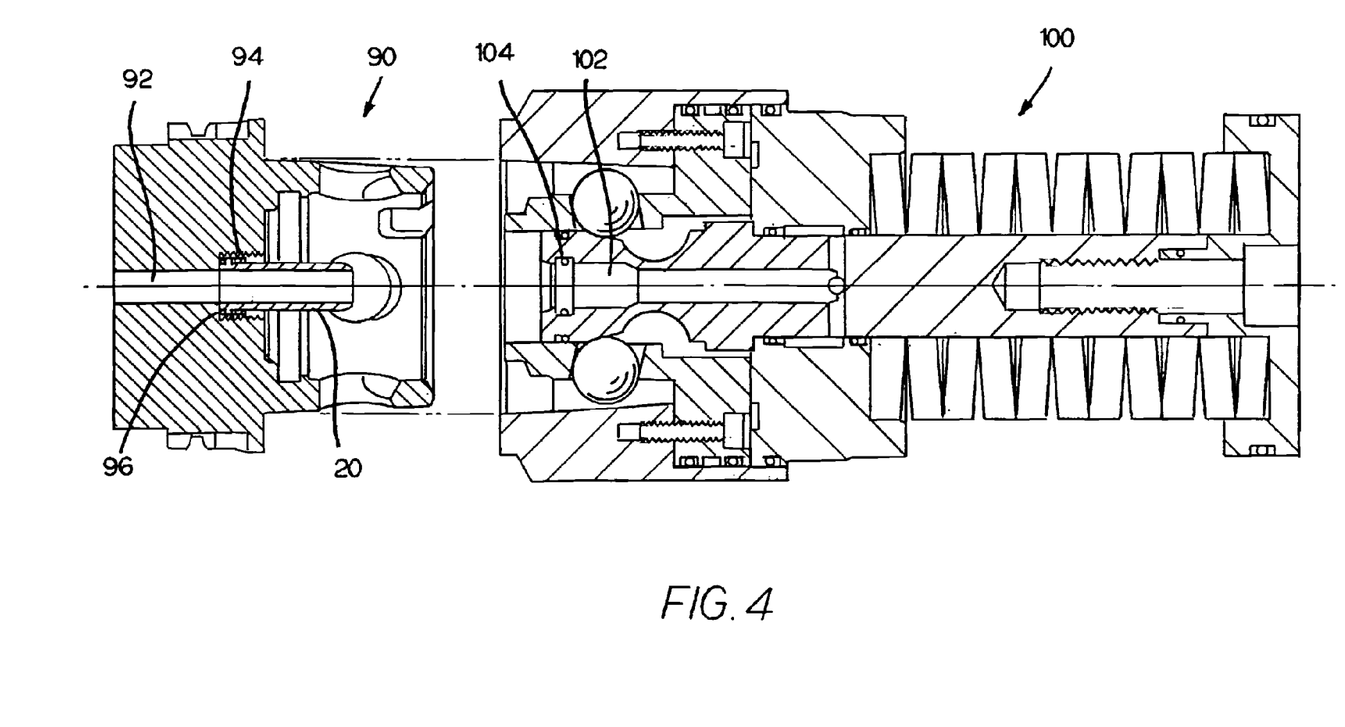
FIG. 4 is a cross-sectional view of the tool body and the clamping unit assembly spaced apart with the high pressure coolant tube threaded into the tool body.
Figure 5:
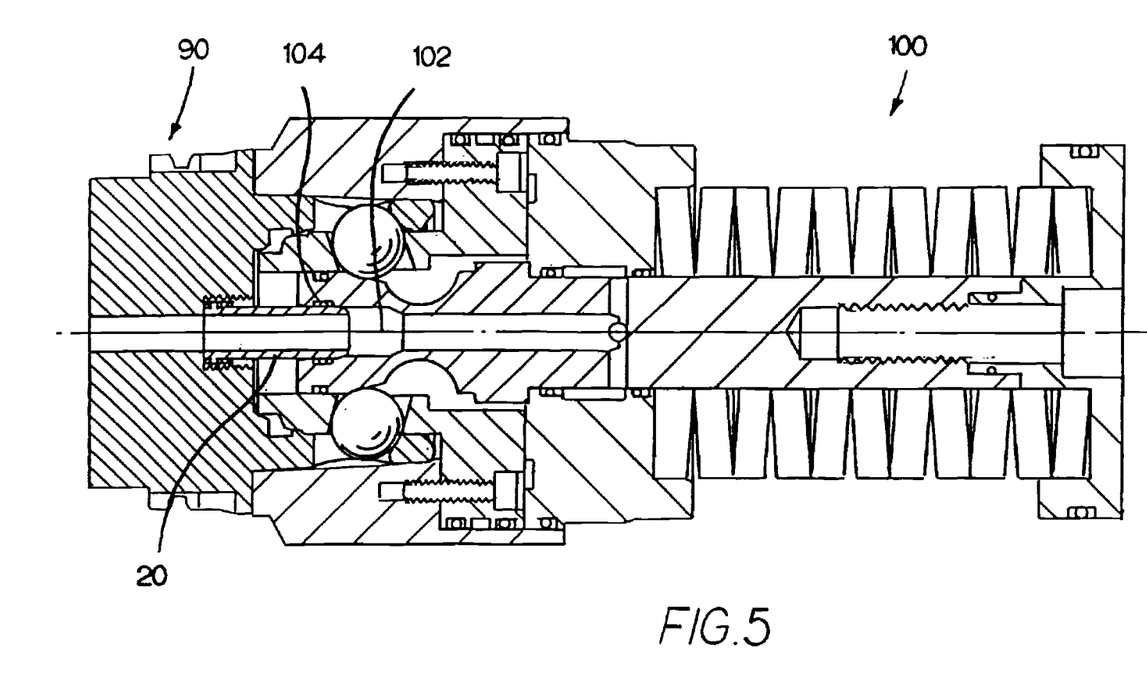
FIG. 5 is a cross-sectional view of the tool body and the clamping unit assembly of FIG. 4 wherein the tool body and the clamping unit assembly are connected together wherein the tool body is clamped by the clamping unit assembly.

Referring to the drawings, there is shown a high pressure coolant tube 20 wherein the high pressure coolant tube 20 is designed to be received by a tool body 90 as shown in FIGS. 4 and 5. The details of the connection of the high pressure coolant tube 20 to the tool body 90 are set forth hereinafter, especially in reference to FIG. 4. The high pressure coolant tube 20 provides for the flow of coolant between the tool body 90 and a clamping unit assembly 100 as will be described in more detail hereinafter.

Figure 1:
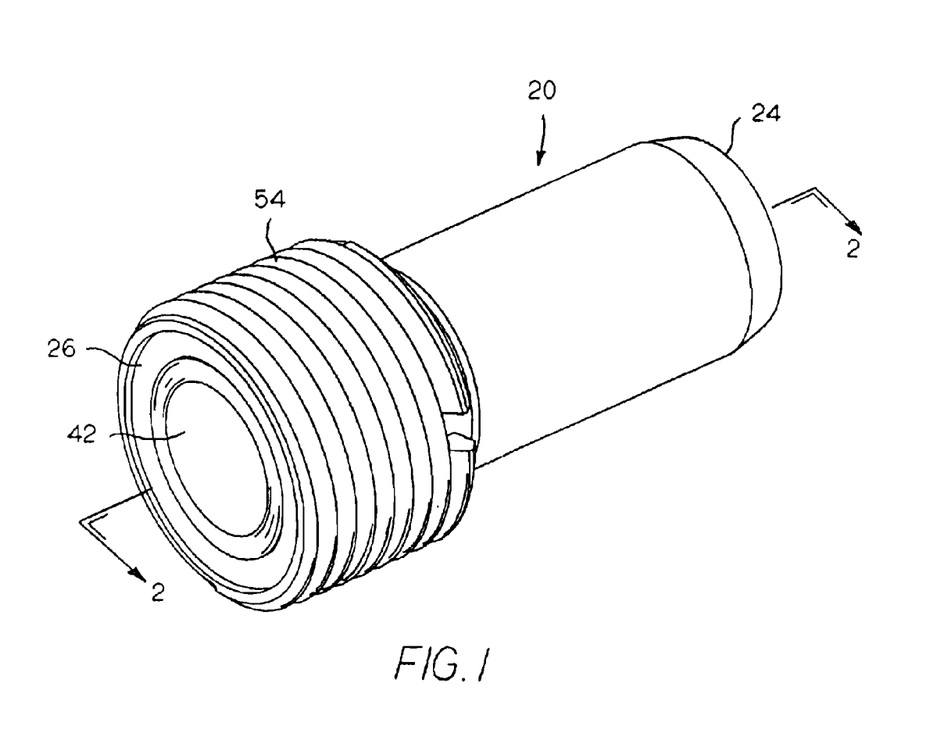
FIG. 1 is an isometric view of a specific embodiment of a high pressure coolant tube.
Figure 2:
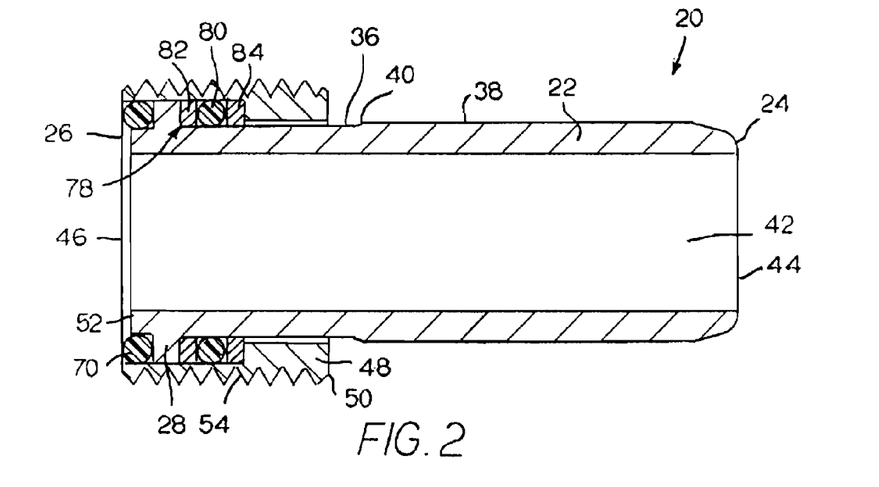
FIG. 2 is a cross-sectional view of the specific embodiment of a high pressure coolant tube taken along section line 2-2 of FIG. 1.
Figure 3:
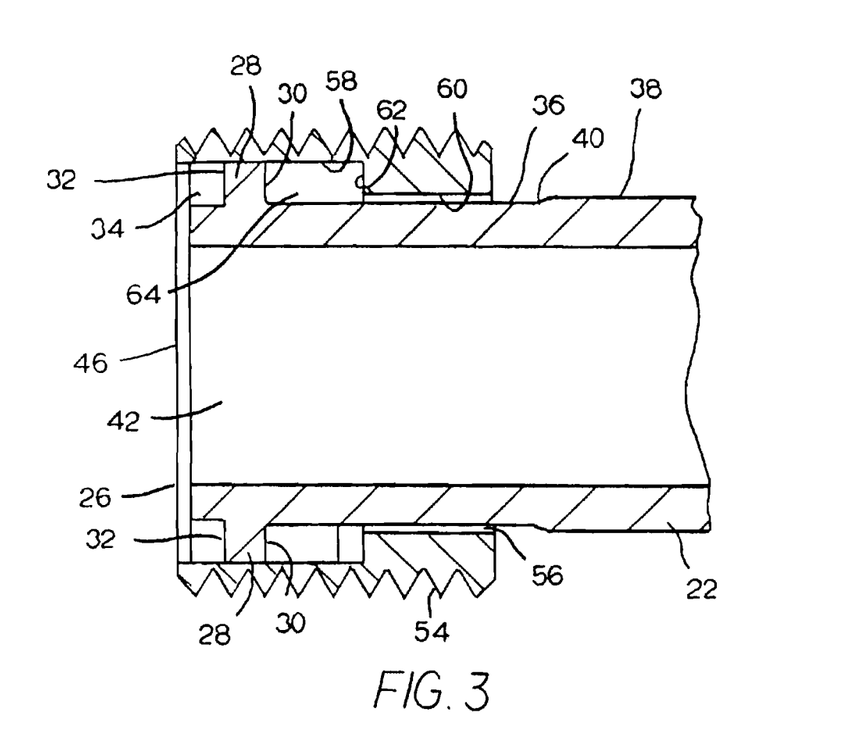
FIG. 3 is an enlarged cross-sectional view of a portion of the high pressure coolant tube with the exit seal and the entrance seal assembly removed.

The high pressure coolant tube 20 comprises a coolant tube body 22 that has an entrance body end 24 and an exit body end 26. The coolant tube body 22 has an annular flange 28 adjacent to the exit body end 26. The annular flange 28 has an entrance-facing flange surface 30 and an exit-facing flange surface 32. The coolant tube body 22 further has a reduced diameter body section 36 and an enlarged diameter body section 38. A shoulder 40 joins the reduced diameter body section 36 and the enlarged diameter body section 38. The coolant tube body 22 contains a central bore 42 that has an entrance bore end 44 and an exit bore end 46.

The high pressure coolant tube 20 further includes a threaded collar 48 that has an exterior threaded surface 54. The threaded collar 48 has an entrance collar end 50 and an exit collar end 52. The threaded collar 48 contains an interior collar bore 56, which comprises an enlarged diameter interior collar bore surface portion 58 and a reduced diameter interior collar bore surface portion 60. A shoulder 62 joins the enlarged diameter interior collar bore surface portion 58 and the reduced diameter interior collar bore surface portion 60. As is apparent, the threaded collar 48 encompasses the portion of the coolant tube body 22 adjacent to the exit body end 26.

There is an exit seal pocket 34 which is defined by an exit-facing flange surface 32 of the annular flange 28 and a reduced diameter body section 36 and the enlarged diameter interior collar bore surface portion 58. There is an entrance seal assembly pocket 64 defined by an entrance-facing flange surface 30 of the annular flange 28 and a reduced diameter body section 36 and the enlarged diameter interior collar bore surface portion 58.

There is an exit seal 70 located in the exit seal pocket 34. The exit seal 70 is a resilient O-ring style of sealing member made from rubber or a like material. There is an entrance seal assembly generally designated as 78 located in the entrance seal assembly pocket 64. The entrance seal assembly 78 comprises an entrance seal 80 sandwiched by a pair of thermoplastic polyester elastomeric rings 82, 84. The entrance seal 80 is a resilient O-ring style of sealing member made from rubber or a like material.

The thermoplastic polyester elastomeric rings 82, 84 comprise a thermoplastic polyester elastomer material. The thermoplastic polyester elastomeric material provides excellent extrusion resistance and is harder than the typical rubber O-ring seals. The thermoplastic polyester elastomeric material provides the flexibility of rubber, the strength of plastics, and the processability of thermoplastics. The thermoplastic polyester elastomeric material is available in hardnesses ranging between about 30 Shore D to about 82 Shore D. The preferred thermoplastic polyester elastomeric material has a hardness of about 56 Shore D as tested per the ASTM D2240 test method. On range of hardness for the thermoplastic polyester elastomeric rings is between about 51 Shore D and about 61 Shore D.

One preferred thermoplastic polyester elastomeric material is sold under the trademark HYTREL® wherein HYTREL® is a registered trademark (Federal Reg. No. 928,057) of E.I. du Pont De Nemours & Company, Wilmington, Del. 19898. The HYTREL® material is available from Parker-Hannifin Corporation under the product designation Z4729D55. E.I. du Pont De Nemours & Company also makes available different grades of HYTREL® with a hardness of 56 Shore D with a range equal to between about 51 Shore D and about 61 Shore D (test method is ASTM D2240), such as, for example, Hytrel®5556, Hytrel®5555HS, and Hytrel®5526.

The threaded collar 48 threads into the threaded portion 94 of the bore 92 in the tool body 90. Upon the complete insertion of the high pressure coolant tube 20 into the bore 92 of the tool body 90, the exit seal 70 is compressed between the tool body shoulder 96 and the exit-facing flange surface 32 of the annular flange 28. The seals provided by the high pressure coolant tube 20, and especially the entrance seal assembly 78, allow the high pressure coolant tube 20 to accommodate coolant pressures in the pressure region equal to about 500 bar. When the tool body 90 is clamped to the clamping unit assembly 100, the high pressure coolant tube 20 extends into the bore 102 and the seals 104 sealing engage the high pressure coolant tube 20 to create a fluid-tight seal (see FIG. 5).

Figure 6:
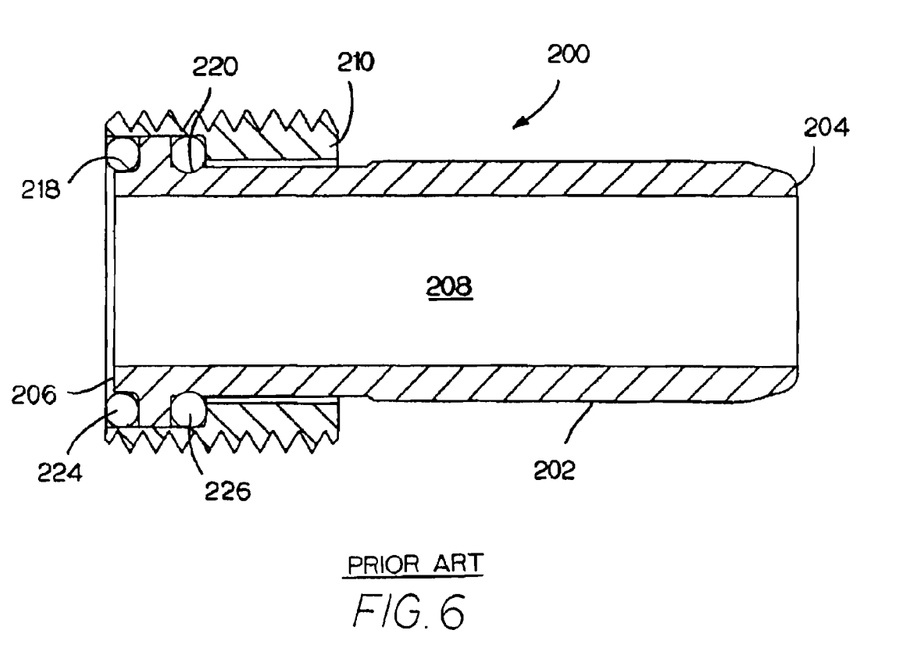
FIG. 6 is a cross-sectional view of an earlier coolant tube and is labeled PRIOR ART.

There should be an appreciation that there is an earlier coolant tube structure such as is illustrated in FIG. 6. The present invention, which is shown in FIGS. 1-5, is an improvement over the coolant tube shown in FIG. 6. As set forth hereinabove, the earlier coolant tube 200 is operational at a pressure of up to about 80 bar, but does not exhibit satisfactory operational characteristics at pressures over about 80 bar, and especially at pressures in the range of about 500 bar. The present high pressure coolant tube invention of FIGS. 1-5 is satisfactory to operate at pressures in the range of about 500 bar.

Referring to FIG. 6, there is shown an earlier coolant tube 200, which is a HSK-A coolant tube DIN Standard Number 69895, wherein the coolant tube 200 is designed to be received by a tool body such as the tool body that is shown in FIGS. 4 and 5. Coolant tube 200 provides for the flow of coolant between the tool body and a clamping unit assembly, but the pressure of the coolant is at about 80 bar or lower. The coolant tube 200 includes a coolant tube body 202 that has an entrance body end 204 and an exit body end 206. The coolant tube body 202 contains a central bore 208 that has an entrance bore end and an exit bore end. The coolant tube 200 further includes a threaded collar 210 that has an exterior threaded surface. As is apparent, the threaded collar 210 encompasses the portion of the coolant tube body 202 adjacent to the exit body end 206.

There are a pair of seal pockets adjacent the exit body end 206. More specifically, there is an axial rearward exit seal pocket 218 closest to the exit body end 206. There is an axial forward exit seal pocket 220 in the vicinity of the exit body end 206, but axially forward of the axial rearward exit seal pocket 218. There is an axial rearward exit seal 224 in the axial rearward exit seal pocket 218 and an axial forward exit seal 226 in the axial forward exit seal pocket 220. The axial rearward exit seal 224 and the axial forward exit seal 226 are each a resilient O-ring style made from rubber or a like material.

The threaded collar 210 threads into a threaded portion of the bore in the tool body. Upon complete insertion of the coolant tube 200 into the bore of the tool body, the axial rearward exit seal 224 and the axial forward exit seal 226 are compressed to form a seal. However, as previously mentioned, these seals are operational at a pressure of up to about 80 bar, but do not exhibit satisfactory operational characteristics at pressures over about 80 bar, and especially at pressures in the range of about 500 bar. The combination of the threaded collar 210 and the coolant tube body 202 exhibits some degree of flexibility to accommodate misalignment or displacement during the assembly of the tool body and a clamping unit assembly. This is in contrast to a single piece coolant tube which exhibits more rigidity.

It is apparent that the present invention provides a coolant tube that achieves satisfactory performance at coolant pressures in the pressure region equal to about 500 bar. It is also apparent that the present invention provides a coolant tube that when subjected to coolant pressures in the pressure region equal to about 500 bar, the coolant tube does not allow for backflow contamination of the clamping unit assembly. The utilization of the entrance seal assembly 78 comprising the entrance seal 80 sandwiched by a pair of HYTREL rings 82, 84 prevents backflow contamination of the clamping unit assembly.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A high pressure coolant tube for receipt by a tool body, the high pressure coolant tube comprising:
   a coolant tube body having an entrance body end and an exit body end, the coolant tube body having an annular flange adjacent to the exit body end;
   a threaded collar having an exterior threaded surface, the threaded collar containing an interior collar bore comprising an enlarged diameter interior collar bore surface portion and a reduced diameter interior collar bore surface portion;
   an exit seal pocket defined by an exit-facing flange surface of the annular flange and a reduced diameter body section and the enlarged diameter interior collar bore surface portion;
   an entrance seal assembly pocket defined by an entrance-facing flange surface of the annular flange and the reduced diameter body section and the enlarged diameter interior collar bore surface portion;
   an exit seal being in the exit seal pocket; and
   an entrance seal assembly being in the entrance seal assembly pocket, and the entrance seal assembly comprising an entrance seal sandwiched by a pair of thermoplastic polyester elastomeric rings,
   wherein the thermoplastic polyester elastomeric rings have a hardness greater than a hardness of the entrance seal.

2. The high pressure coolant tube according to claim 1 wherein the thermoplastic polyester elastomeric rings have a hardness of between about 51 Shore D and about 61 Shore D.

3. The high pressure coolant tube according to claim 1 wherein the thermoplastic polyester elastomeric rings have a hardness of about 56 Shore D.

4. The high pressure coolant tube according to claim 1 wherein the thermoplastic polyester elastomeric rings have a hardness greater than a hardness of the exit seal.

5. A tool body-high pressure coolant tube assembly comprising:
   a tool body that contains a bore having a threaded bore portion wherein the threaded bore portion terminates at a tool body shoulder;
   a high pressure coolant tube comprising:
   a coolant tube body having an entrance body end and an exit body end, the coolant tube body having an annular flange adjacent to the exit body end;
   a threaded collar having an exterior threaded surface, the threaded collar containing an interior collar bore comprising an enlarged diameter interior collar bore surface portion and a reduced diameter interior collar bore surface portion;
   an exit seal pocket defined by an exit-facing flange surface of the annular flange and a reduced diameter body section and the enlarged diameter interior collar bore surface portion;
   an entrance seal assembly pocket defined by an entrance-facing flange surface of the annular flange and the reduced diameter body section and the enlarged diameter interior collar bore surface portion;
   an exit seal being in the exit seal pocket;
   an entrance seal assembly being in the entrance seal assembly pocket, and the entrance seal assembly comprising an entrance seal sandwiched by a pair of thermoplastic polyester elastomeric rings;
   wherein upon the complete insertion of the high pressure coolant tube into the bore of the tool body, the exit seal being compressed between the tool body shoulder and the exit-facing flange surface of the annular flange; and
   wherein the thermoplastic polyester elastomeric rings have a hardness greater than a hardness of the entrance seal.

6. The tool body-high pressure coolant tube assembly according to claim 5 wherein the thermoplastic polyester elastomeric rings have a hardness of between about 51 Shore D and about 61 Shore D.

7. The tool body-high pressure coolant tube assembly according to claim 5 wherein the thermoplastic polyester elastomeric rings have a hardness of about 56 Shore D.

8. The tool body-high pressure coolant tube assembly according to claim 5 wherein the thermoplastic polyester elastomeric rings have a hardness greater than a hardness of the exit seal.

9. A high pressure coolant tube for receipt by a tool body and capable of operating at a coolant pressure of up to about 500 bar, the high pressure coolant tube comprising:
   a coolant tube body having an entrance body end and an exit body end, the coolant tube body having an annular flange adjacent to the exit body end;
   a threaded collar having an exterior threaded surface, the threaded collar containing an interior collar bore comprising an enlarged diameter interior collar bore surface portion and a reduced diameter interior collar bore surface portion;
   an exit seal pocket defined by an exit-facing flange surface of the annular flange and a reduced diameter body section and the enlarged diameter interior collar bore surface portion;
   an entrance seal assembly pocket defined by an entrance-facing flange surface of the annular flange and the reduced diameter body section and the enlarged diameter interior collar bore surface portion;
   an exit seal being in the exit seal pocket, and the exit seal comprising a rubber material; and an entrance seal assembly being in the entrance seal assembly pocket, and the entrance seal assembly comprising an entrance seal sandwiched by a pair of thermoplastic polyester elastomeric rings, the entrance seal comprising a rubber material, and wherein the thermoplastic polyester elastomeric rings having a hardness of between about 51 Shore D and about 61 Shore D,
   wherein the thermoplastic polyester elastomeric rings have a hardness greater than a hardness of the entrance seal.

10. The high pressure coolant tube according to claim 9 wherein the thermoplastic polyester elastomeric rings have a hardness greater than a hardness of the exit seal.

11. The high pressure coolant tube according to claim 9 wherein the thermoplastic polyester elastomeric rings have a hardness greater than a hardness of the entrance seal, and the thermoplastic polyester elastomeric rings have a hardness greater than a hardness of the exit seal.

* * * * *